US011042440B2

(12) United States Patent
Jensen

(10) Patent No.: US 11,042,440 B2
(45) Date of Patent: Jun. 22, 2021

(54) DATA CHECKSUMS WITHOUT STORAGE OVERHEAD

(71) Applicant: Memoscale AS, Trondheim (NO)

(72) Inventor: Rune Erlend Jensen, Trondheim (NO)

(73) Assignee: MEMOSCALE AS, Trondheim (NO)

( * ) Notice: Subject to any disclaimer, the term of this patent is extended or adjusted under 35 U.S.C. 154(b) by 164 days.

(21) Appl. No.: 16/085,868

(22) PCT Filed: Mar. 17, 2017

(86) PCT No.: PCT/IB2017/000354
§ 371 (c)(1),
(2) Date: Sep. 17, 2018

(87) PCT Pub. No.: WO2017/158430
PCT Pub. Date: Sep. 21, 2017

(65) Prior Publication Data
US 2019/0114221 A1 Apr. 18, 2019

(30) Foreign Application Priority Data
Mar. 18, 2016 (GB) ..................... 1604648

(51) Int. Cl.
*G06F 11/00* (2006.01)
*G06F 11/10* (2006.01)
(52) U.S. Cl.
CPC ........ *G06F 11/108* (2013.01); *G06F 11/1004* (2013.01); *G06F 11/1076* (2013.01); *G06F 2211/104* (2013.01)
(58) Field of Classification Search
CPC ......... G06F 11/1076; G06F 2211/1061; G06F 2211/1057; G06F 2211/1064; G06F 2211/109; G06F 2211/1059; G06F 11/108
See application file for complete search history.

(56) References Cited

U.S. PATENT DOCUMENTS

| 6,101,615 A | 8/2000 | Lyons |
| 6,353,895 B1 | 3/2002 | Stephenson |

(Continued)

OTHER PUBLICATIONS

Google Scholar/Patents—text refined (Year: 2021).*
(Continued)

*Primary Examiner* — Christopher S McCarthy
(74) *Attorney, Agent, or Firm* — Saliwanchik, Lloyd & Eisenschenk

(57) ABSTRACT

Disclosed herein is a computer-implemented method of including data characterising values of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method comprising: calculating K data characterising values in dependence on sub-blocks comprised by the source nodes, wherein each of the data characterising values is associated with a different one of the K source nodes, each of the K data characterising values is associated with a different block and each of the K data characterising values is calculated in dependence on all of the sub-blocks of the source node that the data characterising value is associated with except the one sub-block of the source node that is also comprised by the block that the data characterising value is associated with; and generating one or more sub-blocks of the source and redundant nodes in dependence on the K data characterising values. Advantages include one or more of improved determination of whether or not the stored data comprises errors, an increase in the number of errors that can detected and improved recovery from errors. By including data characteristics (Continued)

within the stored data rather than as metadata, the data characteristics do not increase the amount of metadata required.

20 Claims, 15 Drawing Sheets

(56) References Cited

U.S. PATENT DOCUMENTS

| | | | |
|---|---|---|---|
| 7,073,024 | B1 | 7/2006 | Chilton |
| 7,836,379 | B1 | 11/2010 | Ricci et al. |
| 9,026,729 | B1 | 5/2015 | Hallak et al. |
| 9,104,342 | B2 | 8/2015 | Bourbonnais et al. |
| 2004/0078642 | A1 | 4/2004 | Nanda |
| 2006/0294416 | A1* | 12/2006 | Tsai .................... G06F 11/1076 714/6.2 |
| 2009/0006886 | A1 | 1/2009 | O'Connor et al. |
| 2012/0084506 | A1 | 4/2012 | Colgrove et al. |
| 2013/0205183 | A1* | 8/2013 | Fillingim ............ G06F 12/0253 714/773 |
| 2016/0218742 | A1* | 7/2016 | Goker .................... H04L 1/007 |
| 2018/0373439 | A1* | 12/2018 | Xu ........................ G06F 3/0637 |
| 2020/0110659 | A1* | 4/2020 | Foley .................. G06F 11/0721 |

OTHER PUBLICATIONS

GB Intellectual Property Office, Combined Search and Examination Report under Sections 17 & 18(3), GB Application No. 1604648.4, dated Jun. 14, 2016.
International Search Report and Written Opinion, International Application No. PCT/IB2017/000354, dated Aug. 7, 2017.

* cited by examiner

| D1 | D2 | D3 | Dr1 |
|---|---|---|---|
| $D1_1$ | $D2_1$ | $D3_1$ | $Dr1_1 = D1_1 + D2_1 + D3_1$ |
| ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ |
| $D1_{x-3}$ | $D2_{x-3}$ | $D3_{x-3}$ | $Dr1_{x-3} = (D1_{x-3} + CRC(D1 \setminus D1_{x-3})) + D2_{x-3} + D3_{x-3}$ |
| $D1_{x-2}$ | $D2_{x-2}$ | $D3_{x-2}$ | $Dr1_{x-2} = D1_{x-2} + (D2_{x-2} + CRC(D2 \setminus D2_{x-2})) + D3_{x-2}$ |
| $D1_{x-1}$ | $D2_{x-1}$ | $D3_{x-1}$ | $Dr1_{x-1} = D1_{x-1} + D2_{x-1} + (D3_{x-1} + CRC(D3 \setminus D3_{x-1}))$ |
| $D1_x$ | $D2_x$ | $D3_x$ | $Dr1_x = D1_x + D2_x + D3_x + CRC(Dr1 \setminus Dr1_x)$ |

Figure 1

| D1 | D2 (Dr1) |
|---|---|
| $D1_1$ | $D2_1 = D1_1$ |
| ... | ... |
| $D1_{x-2}$ | $D2_{x-2} = D1_{x-2}$ |
| $D1_{x-1}$ | $D2_{x-1} = D1_{x-1} + CRC(D1 \setminus D1_{x-1})$ |
| $D1_x$ | $D2_x = D1_x + CRC(D2 \setminus D2_x)$ |

Figure 2

| D1 | D2 | D3 | Dr1 | Dr2 |
|---|---|---|---|---|
| $D1_1$ | $D2_1$ | $D3_1$ | $Dr1_1 = D1_1 + D2_1 + D3_1$ | $Dr2_1 = D1_1 + D2_1^2 + D3_1^3$ |
| ... | ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ | $Dr2_{x-4} = D1_{x-4} + D2_{x-4}^2 + D3_{x-4}^3$ |
| $D1_{x-3}$ | $D2_{x-3}$ | $D3_{x-3}$ | $Dr1_{x-3} = (D1_{x-3} + CRC(D1 \setminus D1_{x-3})) + D2_{x-3} + D3_{x-3}$ | $Dr2_{x-3} = (D1_{x-3}\ CRC(D1 \setminus D1_{x-3})) + D2_{x-3}^2 + D3_{x-3}^3$ |
| $D1_{x-2}$ | $D2_{x-2}$ | $D3_{x-2}$ | $Dr1_{x-2} = D1_{x-2} + (D2_{x-2} + CRC(D2 \setminus D2_{x-2})) + D3_{x-2}$ | $Dr2_{x-2} = D1_{x-2} + (D2_{x-2} + CRC(D2 \setminus D2_{x-2}))^2 + D3_{x-2}^3$ |
| $D1_{x-1}$ | $D2_{x-1}$ | $D3_{x-1}$ | $Dr1_{x-1} = D1_{x-1} + D2_{x-1} + (D3_{x-1} + CRC(D3 \setminus D3_{x-1}))$ | $Dr2_{x-1} = D1_{x-1} + D2_{x-1}^2 + (D3_{x-1} + CRC(D3 \setminus D3_{x-1}))^3$ |
| $D1_x$ | $D2_x$ | $D3_x$ | $Dr1_x = D1_x + D2_x + D3_x + CRC(Dr1 \setminus Dr1_x)$ | $Dr2_x = D1_x + D2_x^2 + D3_x^3 + CRC(Dr2 \setminus Dr2_x)^2$ |

Figure 3

| D1 | D2 | D3 | Dr1 | Dr2 |
|---|---|---|---|---|
| $D1_1$ | $D2_1$ | $D3_1$ | $Dr1_1 = D1_1 + D2_1 + D3_1$ | $Dr2_1 = D1_1 + D2_1^2 + D3_1^3$ |
| ... | ... | ... | ... | ... |
| $D1_{x-5}$ | $D2_{x-5}$ | $D3_{x-5}$ | $Dr1_{x-5} = D1_{x-5} + D2_{x-5} + D3_{x-5}$ | $Dr2_{x-5} = D1_{x-5} + D2_{x-5}^2 + D3_{x-5}^3$ |
| $D1_{x-4}$ | $D2_{x-4}$ | $D3_{x-4}$ | $Dr1_{x-4} = (D1_{x-4} + CRC(D1 \setminus D1_{x-4})) + D2_{x-4} + D3_{x-4}$ | $Dr2_{x-4} = (D1_{x-4} + CRC(D1 \setminus D1_{x-4})) + D2_{x-4}^2 + D3_{x-4}^3$ |
| $D1_{x-3}$ | $D2_{x-3}$ | $D3_{x-3}$ | $Dr1_{x-3} = D1_{x-3} + (D2_{x-3} + CRC(D2 \setminus D2_{x-3})) + D3_{x-3}$ | $Dr2_{x-3} = D1_{x-3} + (D2_{x-3} + CRC(D2 \setminus D2_{x-3}))^2 + D3_{x-3}^3$ |
| $D1_{x-2}$ | $D2_{x-2}$ | $D3_{x-2}$ | $Dr1_{x-2} = D1_{x-2} + D2_{x-2} + (D3_{x-2} + CRC(D3 \setminus D3_{x-2}))$ | $Dr2_{x-2} = D1_{x-2} + D2_{x-2}^2 + (D3_{x-2} + CRC(D3 \setminus D3_{x-2}))^3$ |
| $D1_{x-1}$ | $D2_{x-1}$ | $D3_{x-1}$ | $Dr1_{x-1} = D1_{x-1} + D2_{x-1} + D3_{x-1} + CRC(Dr1 \setminus Dr1_{x-1})$ | $Dr2_{x-1} = D1_{x-1} + D2_{x-1}^2 + D3_{x-1}^3$ |
| $D1_x$ | $D2_x$ | $D3_x$ | $Dr1_x = D1_x + D2_x + D3_x$ | $Dr2_x = D1_x + D2_x^2 + D3_x^3 + CRC(Dr2 \setminus Dr2_x)$ |

Figure 4

| D1 | D2 (Dr1) | D3 (Dr2) |
|---|---|---|
| $D1_1$ | $Dr1_1 = D1_1$ | $Dr2_1 = D1_1$ |
| ... | ... | ... |
| $D1_{x-3}$ | $Dr1_{x-3} = D1_{x-3}$ | $Dr2_{x-3} = D1_{x-3}$ |
| $D1_{x-2}$ | $Dr1_{x-2} = D1_{x-2} + CRC(D1 \setminus D1_{x-2})$ | $Dr2_{x-2} = (D1_{x-2} + CRC(D1 \setminus D1_{x-2}))$ |
| $D1_{x-1}$ | $Dr1_{x-1} = D1_{x-1} + CRC(Dr1 \setminus Dr1_{x-1})$ | $Dr2_{x-1} = D1_{x-1}$ |
| $D1_x$ | $Dr1_x = D1_x$ | $Dr2_x = D1_x + CRC(Dr2 \setminus Dr2_x)$ |

Figure 6

| D1 | D2 (Dr1) | D3 (Dr2) |
|---|---|---|
| $D1_1$ | $Dr1_1 = D1_1$ | $D3_1 = D1_1$ |
| ... | ... | ... |
| $D1_{x-3}$ | $Dr1_{x-3} = D1_{x-3}$ | $Dr2_{x-3} = D1_{x-3}$ |
| $D1_{x-2}$ | $Dr1_{x-2} = D1_{x-2}$ | $Dr2_{x-2} = D1_{x-2}$ |
| $D1_{x-1}$ | $Dr1_{x-1} = D1_{x-1} + CRC(D1 \setminus D1_{x-1})$ | $Dr2_{x-1} = D1_{x-1} + CRC(D1 \setminus D1_{x-1})$ |
| $D1_x$ | $Dr1_x = D1_x + CRC(Dr1 \setminus Dr1_x)$ | $Dr2_x = D1_x + CRC(Dr2 \setminus Dr2_x)$ |

Figure 7

| D1 | D2 (Dr1) | D3 (Dr2) |
|---|---|---|
| $D1_1$ | $Dr1_1 = D1_1$ | $Dr23_1 = D1_1$ |
| ... | ... | ... |
| $D1_{x-3}$ | $Dr1_{x-3} = D1_{x-3}$ | $Dr2_{x-3} = D1_{x-3}$ |
| $D1_{x-2}$ | $Dr1_{x-2} = D1_{x-2}$ | $Dr2_{x-2} = D1_{x-2}$ |
| $D1_{x-1}$ | $Dr1_{x-1} = D1_{x-1} + CRC(D1 \setminus D1_{x-1})$ | $Dr2_{x-1} = D1_{x-1} + CRC(D1 \setminus D1_{x-1})$ |
| $D1_x$ | $Dr1_x = D1_x + CRC(Dr1 \setminus Dr1_x)$ | $Dr2_x = D1_x + CRC(Dr2 \setminus Dr2_x)^2$ |

Figure 8

| D1 | D2 | D3 | Dr1 |
|---|---|---|---|
| $D1_1$ | $D2_1$ | $D3_1$ | $Dr1_1 = D1_1 + D2_1 + D3_1$ |
| ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ |
| $D1_{x-3}' = D1_{x-3} + CRC(D1 \setminus D1_{x-3})$ | $D2_{x-3}$ | $D3_{x-3}$ | $Dr1_{x-3} = D1_{x-3} + D2_{x-3} + D3_{x-3}$ |
| $D1_{x-2}$ | $D2_{x-2}' = D2_{x-2} + CRC(D2 \setminus D2_{x-2})$ | $D3_{x-2}$ | $Dr1_{x-2} = D1_{x-2} + D2_{x-2} + D3_{x-2}$ |
| $D1_{x-1}$ | $D2_{x-1}$ | $D3_{x-1}' = D3_{x-1} + CRC(D3 \setminus D3_{x-1})$ | $Dr1_{x-1} = D1_{x-1} + D2_{x-1} + D3_{x-1}$ |
| $D1_x$ | $D2_x$ | $D3_x$ | $Dr1_x = D1_x + D2_x + D3_x + CRC(Dr1 \setminus Dr1_x)$ |

Figure 9

| D1 | Dr1 | Dr2 |
|---|---|---|
| $D1_1$ | $Dr1_1 = D1_1$ | $Dr2_1 = D1_1$ |
| ... | ... | ... |
| $D1_{x-3}$ | $Dr1_{x-3} = D1_{x-3}$ | $Dr2_{x-3} = D1_{x-3}$ |
| $D1_{x-2}' = D1_{x-2} + CRC(D1 \setminus D1_{x-2})$ | $Dr1_{x-2} = D1_{x-2}$ | $Dr2_{x-2} = D1_{x-2}$ |
| $D1_{x-1}$ | $Dr1_{x-1} = D1_{x-1} + CRC(Dr1 \setminus Dr1_{x-1})$ | $Dr2_{x-1} = D1_{x-1}$ |
| $D1_x$ | $Dr1_x$ | $Dr2_x = D1_x + CRC(Dr2 \setminus Dr2_x)$ |

Figure 10

| D1 | Dr1 |
|---|---|
| $D1_1$ | $Dr1_1 = D1_1$ |
| ... | ... |
| $D1_Y$ | $Dr1_Y = D1_Y$ |
| $D1_{Y+1}$ | $Dr1_{Y+1} = D1_{Y+1}$ |
| ... | ... |
| ... | ... |
| $D1_{X-2}$ | $Dr1_{X-2} = D1_{X-2}$ |
| $D1_{X-1}$ | $Dr1_{X-1} = D1_{X-1} + CRC(D1_1 \text{ to } D1_Y) + CRC(D1_{Y+1} \text{ to } D1_{X-1})$ |
| $D1_X$ | $Dr1_X = D1_X + CRC(Dr1 \setminus Dr1_x)$ |

Figure 12

| D1 | D2 | D3 | Dr1 |
|---|---|---|---|
| $D1_1$ | $D2_1$ | $D3_1$ | $Dr1_1 = D1_1 + D2_1 + D3_1$ |
| ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ |
| $D1_{x-3}$ | $D2_{x-3}$ | $D3_{x-3}$ | $Dr1_{x-3} = D1_{x-3} + D2_{x-3} + D3_{x-3}$ |
| $D1_{x-2}$ | $D2_{x-2}$ | $D3_{x-2}$ | $Dr1_{x-2} = D1_{x-2} + D2_{x-2} + D3_{x-2}$ |
| $D1_{x-1}$ | $D2_{x-1}$ | $D3_{x-1}$ | $Dr1_{x-1} = (D1_{x-1} + CRC(D1 \setminus D1_{x-1})) + (D2_{x-1} + CRC(D2 \setminus D2_{x-1})) + (D3_{x-1} + CRC(D3 \setminus D3_{x-1}))$ |
| $D1_x$ | $D2_x$ | $D3_x$ | $Dr1_x = D1_x + D2_x + D3_x + CRC(Dr1 \setminus Dr1_x)$ |

Figure 13

| D1 | D2 | D3 | Dr1 |
|---|---|---|---|
| $D1_1$ | $D2_1$ | $D3_1$ | $Dr1_1 = D1_1 + D2_1 + D3_1$ |
| ... | ... | ... | ... |
| $D1_{x-4}$ | $D2_{x-4}$ | $D3_{x-4}$ | $Dr1_{x-4} = D1_{x-4} + D2_{x-4} + D3_{x-4}$ |
| $D1_{x-3}$ | $D2_{x-3}$ | $D3_{x-3}$ | $Dr1_{x-3} = (D1_{x-3} + CRC(D1 \setminus D1_{x-3})) +$ $(D2_{x-3} + CRC(D2 \setminus (D2_{x-3} - D2_{x-1}))_{\text{High bits}}) + D3_{x-3}$ |
| $D1_{x-2}$ | $D2_{x-2}$ | $D3_{x-2}$ | $Dr1_{x-2} = D1_{x-2} +$ $(D2_{x-2} + CRC(D2 \setminus (D2_{x-3} - D2_{x-1}))_{\text{Middle bits}}) + D3_{x-2}$ |
| $D1_{x-1}$ | $D2_{x-1}$ | $D3_{x-1}$ | $Dr1_{x-1} = D1_{x-1} +$ $(D2_{x-1} + CRC(D2 \setminus (D2_{x-3} - D2_{x-1}))_{\text{Low bits}}) + (D3_{x-1} +$ $CRC(D3 \setminus D3_{x-1}))$ |
| $D1_x$ | $D2_x$ | $D3_x$ | $Dr1_x = D1_x + D2_x + D3_x + CRC(Dr1 \setminus Dr1_x)$ |

Figure 14

DATA CHECKSUMS WITHOUT STORAGE OVERHEAD

CROSS-REFERENCE TO RELATED APPLICATIONS

This application is a national stage application of International Patent Application No. PCT/IB2017/000354, filed Mar. 17, 2017, which claims priority to Great Britain Application No. 1604648.4, filed Mar. 18, 2016, the disclosures of each of which are incorporated herein by reference in their entirety, including any figures, tables, and drawings.

FIELD

The field of the invention is the coding of data. Embodiments calculate data characterising values of source data and then include these values within redundant data. Advantages include one or more of improved verification of data and improved recovery from data errors.

BACKGROUND

An ever increasing amount of data is being stored in large capacity distributed data storage systems. RAID (Redundant Array of Independent Disks) are well known configurations of distributed data storage systems. The different configurations are described by RAID levels. RAID levels of 1 and above introduce redundant data into stored data. Redundancy allows a loss of data to be detected and, in some circumstances, the lost data can be recovered.

Data drives have traditionally been provided by mechanical storage media. These can be unreliable because the stored data within mechanical storage media can be corrupted due to, for example, data corruption caused by radiation, physical defects or transition error. SSDs (solid-state drives) are preferable over mechanical storage media because they have faster access times and are not as vulnerable to mechanical problems. However, SSDs are more vulnerable to data corruption than mechanical drives as their medium is more volatile.

In a data storage system there are many possible causes of data loss. For example, failures of data drives may occur, cabling may be faulty, controller mistakes may cause data to be written in the wrong place and stored data may be corrupted. Data erasures and data errors are different types of data loss in a data storage system. For data erasures, it is known with full certainty where the data loss has occurred. For example, if a data drive fails, the data within that data drive has been lost. A controller of the data storage system will determine that the data drive has failed, due to the lack of response of the failed data drive, and so it is known where the data loss has occurred. For data errors, it can be determined that there is an error in the data but the location of the error is harder to determine with full certainty, and it may not be possible to determine the location of the error. For example, if data within an SSD is corrupted due to electro-magnetic radiation, a parity check of the stored data in an array of SSDs including the SSD will determine that an error has occurred in one of the SSDs. However, there has been no failure of any part of the SSD and so it is not possible to determine in which SSD of the array of SSDs the error has occurred. The parity check alone therefore only informs a system operator that there is an error in the data and does not provide sufficient information for the error to be corrected. Data errors are sometimes referred to as silent data corruption and it is more difficult to recover data loss from errors than from erasures.

In order to improve the handling of errors in stored data, it is known to generate and store redundant data, such as parity data. It is also known to calculate properties of the stored data, such as checksums, and to store the properties in metadata. The number of errors that can be detected and/or recovered from depends on what redundant data and metadata is generated. The additional storage requirements due to the redundant data is often significant. However, in some implementations, the metadata of a data storage system is also a significant overhead and may increase the data storage requirements by up to 4%.

Known implementations of data storage systems differ in the amount of redundant data storage, how the redundant data is calculated, what properties of the metadata are calculated and how the properties of the metadata are calculated.

There is a need to improve known coding techniques so as to improve error data recovery in storage systems.

More generally, there is a need to improve coding techniques so as to improve error handling in all data applications, in particular the coding for data for communications.

SUMMARY

According to a first aspect of the invention, there is provided a computer-implemented method of including data characterising values of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method comprising: calculating K data characterising values in dependence on sub-blocks comprised by the source nodes, wherein each of the data characterising values is associated with a different one of the K source nodes, each of the K data characterising values is associated with a different block and each of the K data characterising values is calculated in dependence on all of the sub-blocks of the source node that the data characterising value is associated with except the one sub-block of the source node that is also comprised by the block that the data characterising value is associated with; and generating one or more sub-blocks of the source and redundant nodes in dependence on the K data characterising values.

Preferably, the method further comprises: calculating one or more further data characterising values in dependence on sub-blocks comprised by one or more redundant nodes, wherein each of said further data characterising values is associated with a different one of the R redundant nodes, each of said further data characterising values is associated with a block that is different from all other blocks for which there is an associated data characterising value that is associated with a source node, and each of said further data characterising values is calculated in dependence on all of the sub-blocks of the redundant node that the data characterising value is associated with except the one sub-block of the redundant node that is also comprised by the block that the data characterising value is associated with; and generating one or more sub-blocks of the source or redundant nodes in dependence on said further data characterising values.

Preferably, different sub-blocks of the same redundant node are generated in dependence on each of the data characterising values.

Preferably, sub-blocks comprised by any of the source nodes are not generated in dependence on a data characterising value.

Preferably, the method further comprises generating, for each block with an associated data characterising value, a sub-block of the block that is comprised by a redundant node in dependence on a combination of all of the sub-blocks of the block that are comprised by a source node and the data characterising value associated with the block.

Preferably, the method further comprises generating, for each sub-block in at least one redundant node, the sub-block in dependence on a combination of all of the sub-blocks in the same block as said sub-block and comprised by source nodes.

Preferably, the method further comprises generating, for at least one redundant node, the sub-blocks of the redundant node that are not comprised by blocks with an associated data characterising value in dependence on a combination of sub-blocks comprised by the source data nodes only.

Preferably, one or more of the sub-blocks of one or more of the redundant nodes are generated in dependence on a XOR combination.

Preferably, R is 1.

Preferably, R is 2 or more.

Preferably, K is 1.

Preferably, K is 2 or more.

Preferably, the size of each sub-block is one word.

Preferably, each data characterising value is calculated according to any technique that allows verification of the data that the data characterising value is generated in dependence on.

Preferably, each data characterising value is calculated as any of cyclic redundancy check, hash or signature of the data that it is dependent on.

Preferably, each block with an associated data characterising value is associated with first and second data characterising values, the first data characterising value being the data characterising value as in any preceding claim, and a sub-block that is comprised by a first redundant node is generated in dependence on said first data characterising value, and a sub-block that is comprised by a second redundant node is generated in dependence on said second data characterising value.

Preferably, for each block with a first data characterising value that is associated with a source node, the second data characterising value is the same as the first data characterising value.

Preferably, for each block with a first data characterising value associated with a first redundant node, the second data characterising value is generated in dependence on all of the sub-blocks of a second redundant node except the one sub-block of the second redundant node that is comprised by the block associated with the data characterising value.

Preferably, in each of the redundant nodes, there is a sub-block that is generated in dependence on a data characterising value that is associated with the redundant node that comprises said sub-block, and said data characterising value is generated in dependence on all of the sub-blocks of the redundant node except said sub-block that is generated in dependence on said data characterising value.

Preferably, there is no block that comprises two sub-blocks that are both generated in dependence on data characterising values that have both been generated in dependence on sub-blocks of redundant nodes.

Preferably, prior to any sub-packets being combined with a data characterising value, all of sub-packets comprised by a redundant node are generated in accordance with any of maximum distance separable, MDS, coding, Reed-Solomon coding, forward error correction (FEC) coding, low-density parity-check (LDPC) coding, Local Reconstruction Codes (LRC) coding, minimum-bandwidth regenerating (MBR) coding, minimum-storage regenerating (MSR) coding, or coding with rateless codes or coding with fountain codes.

Preferably, prior to any sub-packets being combined with a data characterising value, all of sub-packets comprised by all of the source and redundant nodes are generated in accordance with a non-systematic coding technique.

Preferably, the one or more sub-blocks of one or more redundant nodes are generated in dependence on the data characterising value by using operations in a GF field that is higher than GF(2). Embodiments also include generating the one or more sub-blocks of one or more redundant nodes in dependence on the data characterising value by using any coding operations that create linear independent equations. For example, the coding used by embodiments may be pure XOR based Cauchy Reed-Solomon or EvenOdd coding.

Preferably, one or more of the sub-blocks comprised by a source node are generated in dependence on a data characterising value.

Preferably, no block comprises two sub-blocks that are generated in dependence on a data characterising value.

Preferably, the method further comprises generating one or more of the sub-blocks in dependence on two data characterising values.

Preferably, the one or more of the sub-blocks that are generated in dependence on two data characterising values are generated in dependence on data characterising values that have been generated in dependence on sub-blocks comprised by different source nodes.

Preferably, different parts of the same data characterising value are stored in different sub-blocks.

Preferably, said data characterising value, that is calculated in dependence on all of the sub-blocks of the source node that the data characterising value is associated with except the one sub-block of the source node that is also comprised by the block that the data characterising value is associated with, is two separate data characterising values.

Preferably, each node is data drive of a data storage system.

Preferably, each block is a data packet for transmission over a network.

According to a second aspect of the invention there is provided a computer-implemented method, wherein there are a plurality of sets of nodes, and wherein each set comprises one or more source nodes and one or more redundant nodes, the method comprising: generating, for each set, one or more redundant nodes of the set in dependence on data characterising values of the source nodes of the set; and generating one or more of the redundant nodes of one of the sets further in dependence on data characterising values of the source nodes in all of the other sets.

Preferably, one or more of the nodes of one or more of the sets are generated according to the method of the first aspect.

According to a third aspect of the invention, there is provided a computer-implemented method of determining if a data error has occurred, the method comprising: obtaining a plurality of sub-blocks of source data; obtaining one or more sub-blocks of redundant data, wherein at least one of the sub-blocks of redundant data has been generated in dependence on a data characterising value of the sub-blocks of source data; determining the data characterising value that said at least one of the sub-blocks of redundant data has been generated in dependence on; calculating a data characterising value in dependence on the obtained sub-blocks of source data; and determining that a data error has occurred in dependence on a comparison of the data characterising value that said at least one of the sub-blocks of redundant data has been generated in dependence on and the data characterising value calculated in dependence on the obtained sub-blocks of source data.

Preferably, the sub-blocks of source and redundant data have been generated in accordance with the method of the first aspect.

Preferably, the method further comprises correcting a detected error by applying logical deduction.

According to a fourth aspect, there is provided a computer readable medium comprising instructions that, when executed, cause a computing device to perform the method of any of the other aspects of the invention.

According to a fifth aspect of the invention, there is provide a data array comprising data generated as shown in any of FIGS. 1 to 14.

LIST OF FIGURES

FIG. 1 shows data in source and redundant nodes according to an embodiment;

FIG. 2 shows data in a source node and a redundant node according to an embodiment;

FIG. 3 shows data in source and redundant nodes according to an embodiment;

FIG. 4 shows data in source and redundant nodes according to an embodiment;

Figure 11:
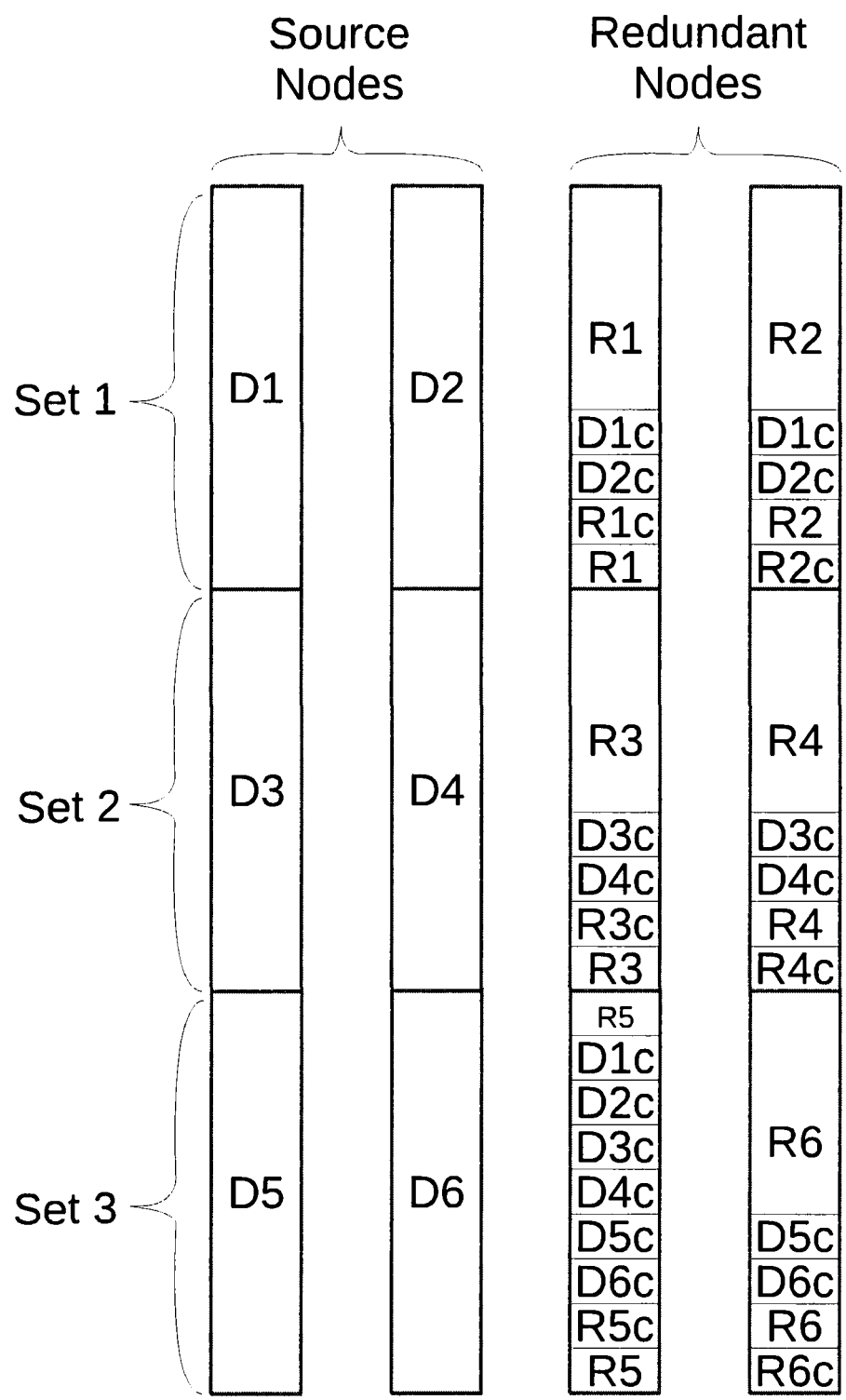
Figure 15:
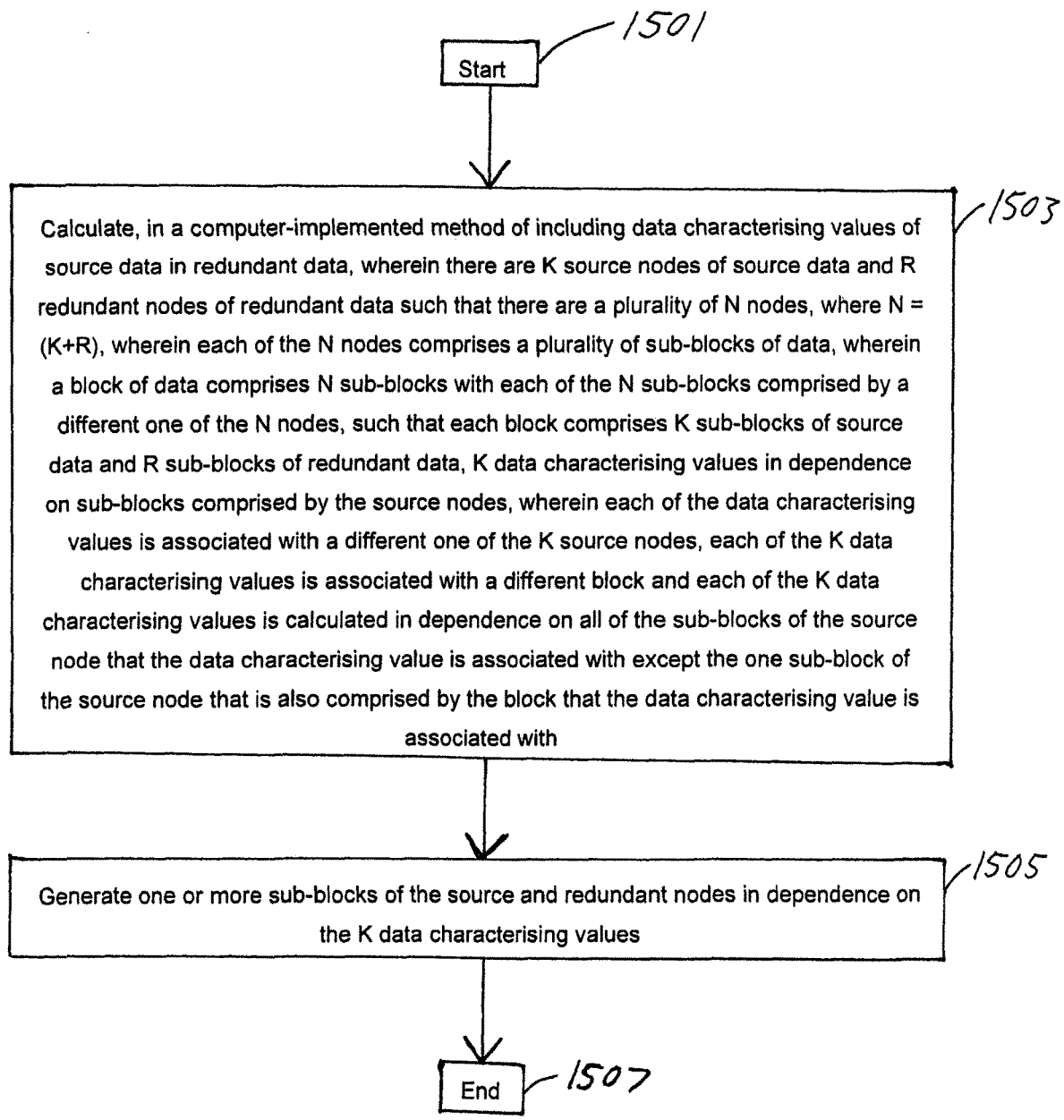

FIG. 6 shows data in nodes according to an embodiment;
FIG. 7 shows data in nodes according to an embodiment;
FIG. 8 shows data in nodes according to an embodiment;
FIG. 9 shows data in nodes according to an embodiment;
FIG. 10 shows data in nodes according to an embodiment;
FIG. 11 shows data in a plurality of sets of source nodes and redundant nodes according to an embodiment;
FIG. 12 shows data in nodes according to an embodiment;
FIG. 13 shows data in nodes according to an embodiment;
FIG. 14 shows data in nodes according to an embodiment; and
FIG. 15 is a flowchart of a method according to an embodiment.

DESCRIPTION

Embodiments provide a data coding technique that improves the use of properties determinable from source data. Characteristics of source data are calculated and included in source and/or redundant data. Advantages of calculating the data characteristics include one or more of improved determination of whether or not the stored data comprises errors, an increase in the number of errors that can detected and improved recovery from errors. By including the data characteristics within the stored data rather than as metadata, the data characteristics do not increase the amount of metadata required.

Embodiments are described in more detail below.

A data coding technique according to a first embodiment is shown in FIG. 1.

A large capacity storage system is typically divided into a plurality of nodes. Each node may represent any of different data drives, stripes, sectors or parts of the data storage system.

FIG. 1 shows systematically coded data in the exemplary application of a data storage system. For systematically coded data, source data is stored in source nodes without further coding applied. Redundant data is generated in dependence on the source data and stored in redundant nodes. Each node may be a data drive of a data storage system.

In FIG. 1, each of the columns, labelled D1, D2, D3 and Dr1, represents a different node. D1, D2 and D3 are source nodes that store source data. Dr1 is a redundant node that stores redundant data.

Each node comprises a plurality of sub-blocks of data. For example, $D1_1$ is individual sub-block of node D1. The total number of sub-blocks comprised by each node is 'x' and all of the nodes comprise the same number of sub-blocks.

The entire data stored in node D1 is stored in the sub-blocks $D1_1$ to $D1_x$.

The entire data stored in node D2 is stored in the sub-blocks $D2_1$ to $D2_x$.

The entire data stored in node D3 is stored in the sub-blocks $D3_1$ to $D3_x$.

The entire data stored in node Dr1 is stored in the sub-blocks $Dr1_1$ to $Dr1_x$.

All of the sub-blocks in all of the nodes are the same size. The size of a sub-block is preferably one word but embodiments include sub-blocks comprising any amount of data.

In FIG. 1, the rows represent blocks of data. A block of data comprises one sub-packet from each of the nodes.

A single block of data is the row comprising the sub-blocks $D1_1$, $D2_1$, $D3_1$ and $Dr1_1$. The other single blocks of data shown in FIG. 1 are $\{D1_{X-3}, D^2_{X-3}, D^3_{X-3}, Dr1_{X-3}\}$, $\{D1_{X-2}, D2_{X-2}, D3_{X-2}, Dr1_{X-2}\}$, $\{D1_{X-1}, D2_{X-1}, D3_{X-1}, Dr1_{X-1}\}$ and $\{D1_X, D2_X, D3_X, Dr1_X\}$.

The data in Dr1 is calculated in dependence on the data in D1, D2 and D3.

All of sub-blocks in $Dr1_1$ to $Dr1_{X-4}$ are calculated as a combination of only the other sub-blocks of source data in the same block as the sub-block of redundant data. In FIG. 1 combinations are represented by the '+' signs. The combinations may be by, for example, XOR operations that may be performed in GF(2).

According to the present embodiment, sub-blocks $Dr1_X$, $Dr1_{X-1}$, $Dr1_{X-2}$ and $Dr1_{X-3}$ of redundant data are generated in a different way from the other sub-blocks of redundant data in Dr1. Each of sub-blocks $Dr1_X$, $Dr1_{X-1}$, $Dr1_{X-2}$ and $Dr1_{X-3}$ are further generated in dependence on a data characterising value of the data.

A data characterising value is any result that can be calculated from data. Examples of a data characterising value include a cyclic redundancy check (CRC), any checksum, hash, signature and other techniques for verifying data integrity. The data characterising value may be any data recoverable from the data itself, including the data layout and implicit properties of the data. Preferably, the data characterising value has a one-to-one relationship with the data that it is generated in dependence on. That is to say, no two data characterising values can be the same as each other and generated in dependence on different data. However, data characterising values that do not have a one-to-one relationship with the data that it is generated in dependence on are also suitable so long as changes in the data are likely to result in a change in the data characterising value.

Well known data characterising values include CRC32, md5, sha1, sha3, sha256 and sha512. It is preferable for the data characterising value to be combinable with the data in a sub-block so each data characterising value preferably has the same data size as a sub-block.

According to the present embodiment, the number of data characterising values that are calculated is one more than the number of source nodes. Each data characterising value is associated with both a node and a block. In the present embodiment, no two data characterising values are associated with the same node and each data characterising value is associated with a different block. Each data characterising value is calculated in dependence on all of the sub-blocks of data within the node associated with the data characterising value except the single sub-block that is also comprised by the block associated with the data characterising value.

In FIG. 1, data characterising values are represented as CRC( ). For node D1, the associated data characterising value is represented as $CRC(D1\backslash D1_{X-3})$. The data characterising value is therefore calculated in dependence on all of the sub-blocks of D1 except $D1_{X-3}$.

Each of the redundant sub-blocks $Dr1_X$, $Dr1_{X-1}$, $Dr1_{X-2}$ and $Dr1_{X-3}$ in Dr1 are calculated in dependence on a combination of all of the sub-blocks of source data in the same block as the redundant sub-block as well as the data characterising value associated with the block that the redundant sub-block is in.

Accordingly:

$$Dr1_{X-3}=D1_{X-3}+D2_{X-3}+D3_{X-3}+CRC(D1\backslash D^1_{X-3})$$

$$Dr1_{X-2}=D1_{X-2}+D2_{X-2}+D3_{X-2}+CRC(D2\backslash D^2_{X-2})$$

$$Dr1_{X-1}=D1_{X-1}+D2_{X-1}+D3_{X-1}+CRC(D3\backslash D3_{X-1})$$

$$Dr1_X=D1_X+D2_X+D3_X+CRC(Dr1\backslash Dr1_X)$$

According to the present embodiment, all but four of the sub-blocks of a redundant node are calculated in dependence on corresponding sub-blocks of source data only. Four of the sub-blocks of the redundant node are further calculated in dependence on data characterising values.

The present embodiment is not limited to the specific number of source data nodes described above. Suppose the number of source nodes is K, the number of redundant nodes R and the total number of nodes is N, where N=K+R. The number of data characterising values that are generated is K+1. The number of sub-blocks of the redundant node that are further calculated in dependence on data characterising values is K+1. The K+1 data characterising values are respectively comprised by K+1 redundant sub-blocks in Dr1.

As will be demonstrated below, the inclusion of the data characterising values in some of the redundant sub-blocks can advantageously allow both the presence of an error in the data to be determined and the location of the error to be determined. The correction of errors is therefore improved. Embodiments provide this advantage without changing the size of the metadata because the data characterising values are comprised by the redundant data.

Consider the known parity technique of all of the data in the redundant node being calculated as an XOR combination of all of the data in the source nodes. The redundant data can be used to recover any one of the source nodes in the event of a data erasure. For example, if a first source node fails, and it is known with full certainty that it is the first source node that has failed, then the first source node can be reconstructed by subtracting the data in the other source nodes from the data in the redundant node.

A limitation of such a known technique is that data errors with unknown locations cannot be corrected. An error is detected whenever the data in the redundant node is not equal to a combination of the data in all of the source nodes. Although it can be determined that at least one error has occurred, the error cannot be corrected because it is not known which of the nodes comprises the error.

In addition, to verify that the source data is correct requires reading all of the sub-blocks in the redundant node, computing expected redundant data from the read source data and comparing the expected redundant data with the read redundant data.

By coding data according to embodiments, both data verification and error correction are improved.

To verify the source data, it is not necessary to read all of the sub-blocks in the redundant node. It is only necessary to read the sub-blocks of the redundant node that have been generated in dependence on a data characterising value of a source node. In the example shown in FIG. 1, it is only necessary to read the sub-blocks $Dr1_{X-1}$, $Dr1_{X-2}$ and $Dr1_{X-3}$ in Dr1. By calculating data characterising values from the read source data, these can be compared with the obtainable data characterising values from the read redundant sub-blocks to determine if an error has occurred. Accordingly, embodiments reduce the amount of redundant data that needs to be obtained in order to verify the source data.

In addition, by coding according to embodiments, logical deduction can be used to determine the location of an error and the correction of the error is therefore possible. The coding according to the present embodiment enables detection and correction of any number of errors so long as all of the errors occur within the same single sub-block.

Data characterising values of each node are directly calculated and compared with the data characterising values of that are already stored within the redundant node. Any mismatches between these data characterising values can reveal where an error has occurred and the correction of the error.

In addition, any number of errors can occur in the 4 (i.e. K+R) sub-block ranges $\{D1_1$-$D1_{x-4}\}$, $\{D2_1$-$D2_{x-4}\}$, $\{D3_1$-$D3_{x-4}\}$ and $\{Dr1_1$-$Dr1_{x-4}\}$, and still be corrected.

If errors occur in sub-blocks in different nodes, assumptions or trial based recovery may be required to recover from the errors.

The different types of silent error that may occur in the exemplary embodiment with K=3 and R=1, as shown in FIG. 1, are described below. In the following, the data characterising values are referred to as being CRC checksums, but embodiments include any other type of data characterising value being used.

There are ((K+2)*(K+R))=20 distinct possible locations of single errors. They can be organised into 6 groups of errors:

1. (K+R)=4 cases of errors only occurring in a single one of the regions $\{D1_1$ to $D1_{x-4}\}$, $\{D2_1$ to $D2_{x-4}\}$, $\{D3_1$-$D3_{x-4}\}$ and $\{Dr1_1$-$Dr1_{x-4}\}$. In this circumstance, errors only result in a single CRC checksum mismatch.
2. K=3 data sub-blocks that are not included in the CRC checksums for their node, i.e. $D1_{x-3}$, $D2_{x-2}$, $D3_{x-1}$. An error in these locations will also result in a single CRC checksum mismatch.
3. R=1 redundancy sub-block not included in the CRC checksum $Dr1_x$. An error here results in a single CRC checksum mismatch.
4. (K*R)=3 cases where one of the sub-blocks in Dr1 that comprise the CRC checksum is corrupt, i.e. $Dr1_{x-1}$, $Dr1_{x-2}$ and $Dr1_{x-3}$. An error here results in two CRC checksum mismatches.
5. K=3 cases where the error is in a sub-block of one of the source data nodes and is comprised by the block that comprises the CRC checksum for the redundancy drive, i.e. $D1_x$, $D2_x$ and $D3_x$. An error here results in two CRC checksum mismatches.

6. (K*(K−1))=6 cases where the error is in a sub-block of one of the source data nodes and is comprised by the block that comprises the CRC checksum for a source node. An error here results in two CRC checksum mismatches.

In the case of a single silent error, there are two possibilities:

a) There is a single CRC checksum mismatch
b) There are two CRC checksum mismatches A possible logical deduction technique for recovering from the errors is explained below:

a) With a single CRC checksum mismatch it is possible to directly determine the node with the error. For example, if the mismatch is in $CRC(D1\backslash D1_{x-3})$ an error must have occurred in either $D1_1$ to $D1_{x-4}$ or $D1_{x-3}$. Note that $D1_{x-2}$, $D1_{x-1}$, $D1_x$ and $Dr1_{x-3}$ must be error free or else there would have been a mismatch with another CRC checksum. The data comprising an error can be replaced by data recreated from the sub-blocks that have been determined to not comprise errors. This applies to situations 1), 2) and 3) above.

b) When there are two CRC checksum mismatches, there are either multiple corrupted sub-blocks, or a single sub-block error. In situations 4) and 5), there is both one mismatched data CRC checksum and one mismatched redundancy CRC checksum ($Dr1_x$). It is necessary to determine if there is a single error or multiple errors. Suppose that the mismatched source data CRC checksum is called Y and there is a detected error in CRC ($DY\backslash DY_{x-(4-Y)}$). We now assume the error to be in $Dr1_{x-(4-Y)}$, and recover this word using only words from the data drives with the parity equation $Dr1_{x-(4-Y)}= D1_{x-(4-Y)}+D3_{x-(4-Y)}+CRC(DY\backslash DY_{x-(4-Y)})$. If this the new word $Dr1_{x-(4-Y)}'$ and the stored word $Dr1_{x-(4-Y)}$ differ one error has been found. In the case they differ, it is possible to re-compute the $CRC(Dr1\backslash Dr1_x)$ with this new data. If this new CRC checksum does match the stored one, the sub-block comprising an error and the correct reconstructed sub-block have been determined. This covers situation 4 above. In the case that they do not match, it is determined that there are multiple sub-blocks with errors. If, the new word $Dr1_{x-(4-Y)}'$ and the stored word $Dr1_{x-(4-Y)}$ were equal, it is determined that there was no error in $Dr1x-(4-Y)$. Next assume that the error lies in $DY_x$. We compute $CRC(Dr1\backslash Dr1_x)$ and use the equation $Dr1_x=D1_x+D2_x+ D3_x+CRC(Dr1\backslash Dr1_x)$ to compute $DY_x'=Dr1_x-(Dj_x+ Dk_x+CRC(Dr1\backslash Dr1_x))$ where j,k are determinable sub-blocks. If $DY_x'$ and $DY_x$ differ, the location of an error has been determined. The stored $CRC(Dr1\backslash Dr1x)$, can be compared against the computed CRC checksum. If they match, the sub-block comprising an error and the correct reconstructed sub-block have been determined. This covers situation 5 above, and shows how to distinguish from case 4. In the case the CRC checksums do not match we know that there are multiple sub-blocks with errors. If $DY_x'$ and $DY_x$ are equal, there are multiple words with errors. Accordingly, embodiments allow recovery in situations 4) and 5) above and also detect multiple errors. In case 6) there are two mismatched source data CRC checksums. Suppose that the first mismatched data CRC checksum is Y when there is an error with $CRC(DY\backslash DYx-(4-Y))$, and the second mismatched data CRC checksum Z when there is an error with $CRC(DZ\backslash DZx-(4-Z))$. In this case it is known that the redundancy and all the stored CRC checksums are correct. Assume that the error lies in either $DYx-(4-Z)$ or in $DZx-(4-Y)$. Use the computed $CRC(DY\backslash DYx-(4-Y))$ and $CRC(DZ\backslash Dzx-(4-Z))$ to compute $DYx-(4-Z)'$ and $DZx-(4-Y)'$. We can now compare the stored $DYx-(4-Z)$ and $DZx-(4-Y)$ and the recomputed $DYx-(4-Z)'$ and $DZx-(4-Y)'$. If both are equal it is known that there are multiple errors. If both differ it is known know that there are multiple errors. If only one differs, say it was $DYx-(4-Z)'$ that differed, the determination of the stored CRC ($DZ\backslash DZx-(4-Z)$) is retried using $DYx-(4-Z)'$. If this updated version of the stored CRC checksum matches the one computed from the data, the sub-block comprising an error and the correct reconstructed sub-block have been determined. Accordingly, embodiments allow recovery in situation 6) in cases with only a single sub-block comprising an error.

When there are 3 or more CRC checksum mismatches, it is known that there are multiple corrupted sub-blocks and that direct recovery is not possible. However, soft decoding techniques may still be able to recover the data.

In a typical implementation, the number of sub-blocks of data comprised by a node is very much larger than K+1. For example, the number of sub-blocks may be 1024 or greater. Accordingly, within almost all of the data of a node, any number of errors can occur and the errors can be corrected. Embodiments therefore provide improved recovery from data errors.

As defined above, the number of source nodes in the first embodiment is K. K may be one or more.

FIG. 2 shows an embodiment with K=1. Advantageously, this embodiment improves the determination of where an error has occurred, and therefore improves error recovery, over a known data mirroring systems.

A second embodiment is shown in FIG. 3. The second embodiment differs from the first embodiment in that a second redundant node is provided. The presence of an additional redundant node allows MDS coding to be used to improve data recovery further. The data coding is still systematic.

In FIG. 3, and all of the other Figures, the powers of values, i.e. ( )$^z$, such as $D3_1^3$ and $CRC(D2\backslash D2_x)^2$, indicate operations performed in a higher GF field than GF(2). Such operations are known in, for example, Reed-Solomon coding in order to generate nodes of data that are MDS.

The structure and properties of the source nodes D1, D2 and D3 and the redundant node Dr1 in FIG. 3 is the same as that described above for the first embodiment. In particular, the data characterising values for each of these nodes are unchanged from the first embodiment.

The redundant node Dr2 comprises the same number of sub-blocks as the other nodes, with the sub-blocks of each node again all being the same size. In the second embodiment, each block of data now comprises one sub-block from each of the source nodes and one sub-block from each of the two redundant nodes.

In Dr2, individual sub-blocks that store the entire data in Dr2 are $Dr2_1$ to $Dr2_X$.

The data in Dr2 can be coded according to any coding technique but preferably an MDS coding technique is applied, such as Reed Solomon (RS) coding. The coding of data in Dr2 can be performed by coding in a higher field than GF(2).

As shown in FIG. 3, each of the redundant sub-blocks in Dr2 that are blocks with an associated data characterising value are dependent both on the same coding technique of the source nodes used to generate Dr2 and also the data characterising value associated with the block.

For data characterising values that are associated with a source node, the same data characterising value is combined with source data to generate the redundant sub-packets in Dr2.

None of the sub-blocks in Dr2 are dependent on the data characterising value associated with the Dr1 node.

There is a new data characterising value that is associated with the Dr2 node and the same block that is associated with the data characterising value of the Dr1 node.

The data characterising value associated with the Dr2 node is dependent on all of the sub-blocks in the Dr2 node except the sub-block comprised by the block associated with the data characterising value of the Dr2 node.

The coding technique preferably comprises multiplying CRC(Dr1\Dr1$x$) and CRC(Dr2\Dr2$x$) by different GF coefficients. If this condition is not met, there may be some circumstances in which it is not possible to recover the CRC checksum and the error correction capability will be reduced.

An alternative to the implementation shown in FIG. 3 is for the sub-block Dr2$_X$ in the Dr2 node to be calculated in dependence on CRC(D2\D2$_x$) instead of CRC(D2\D2$_x$)$^2$ as shown in FIG. 6. This avoids the use of higher GF field mathematics.

Advantageously, data verification is improved and data recovery is possible when any number of errors occur in any node.

In addition, if the Dr2 node is not used then the coded data becomes the same as that for the first embodiment. All of the advantageous recovery properties as described for the first embodiment are therefore maintained.

FIG. 4 shows another implementation of the present embodiment. This differs from the implementation shown in FIG. 3 in that the data characterising values for the redundant nodes are associated with different blocks. The implementation shown in FIG. 4 has improved error detection and recovery properties from that shown in FIG. 3 and it is not necessary to ensure that CRC(Dr1\Dr1$x$) and CRC(Dr2\Dr2$x$) are multiplied by different GF coefficients For both of the above-described implementations of the present embodiment, error detection and correction are improved over a standard MDS coding technique. Standard error recovery, such as Reed-Solomon, can be used in addition to the direct use of the additional data characterising values. There may therefore be more than one possible way of correcting errors in the data.

The data characterising values can also be used to aid soft-decoding decisions. The code can also be viewed as a concatenated error correction code, with Reed-Solomon as the outer code. It is also possible to use the data characterising values in soft-decoding decisions with Reed-Solomon as the inner code. In this case the data characterising values provide hard knowledge regarding correct data.

The present embodiment is not limited to the specific number of source data nodes described above and there may be any number of source data nodes. The number of blocks with only one associated data characterising value is at least K and K data characterising values are each associated with a different one of the source nodes. For the redundant nodes, implementations include one or more blocks that are each associated with two or more data characterising values. Implementations also include, alternatively or in addition, one or more blocks that are each associated with only one data characterising value.

According to a third embodiment, the number of redundant nodes, R, is increased to three or more. There may also be any number of source nodes and K is not restricted to three. Each node comprises the same number of sub-blocks, with the sub-blocks of each of the nodes all being the same size. Each block of data comprises one sub-block from each of the K source nodes and one sub-block from each of the R redundant nodes.

The data coding is preferably still systematic and preferably an MDS coding technique is used to determine how to code the data in the redundant nodes, as described for the second embodiment.

The number of blocks with only one associated data characterising value is at least K as K data characterising values are respectively associated with the K source nodes.

Figure 5:
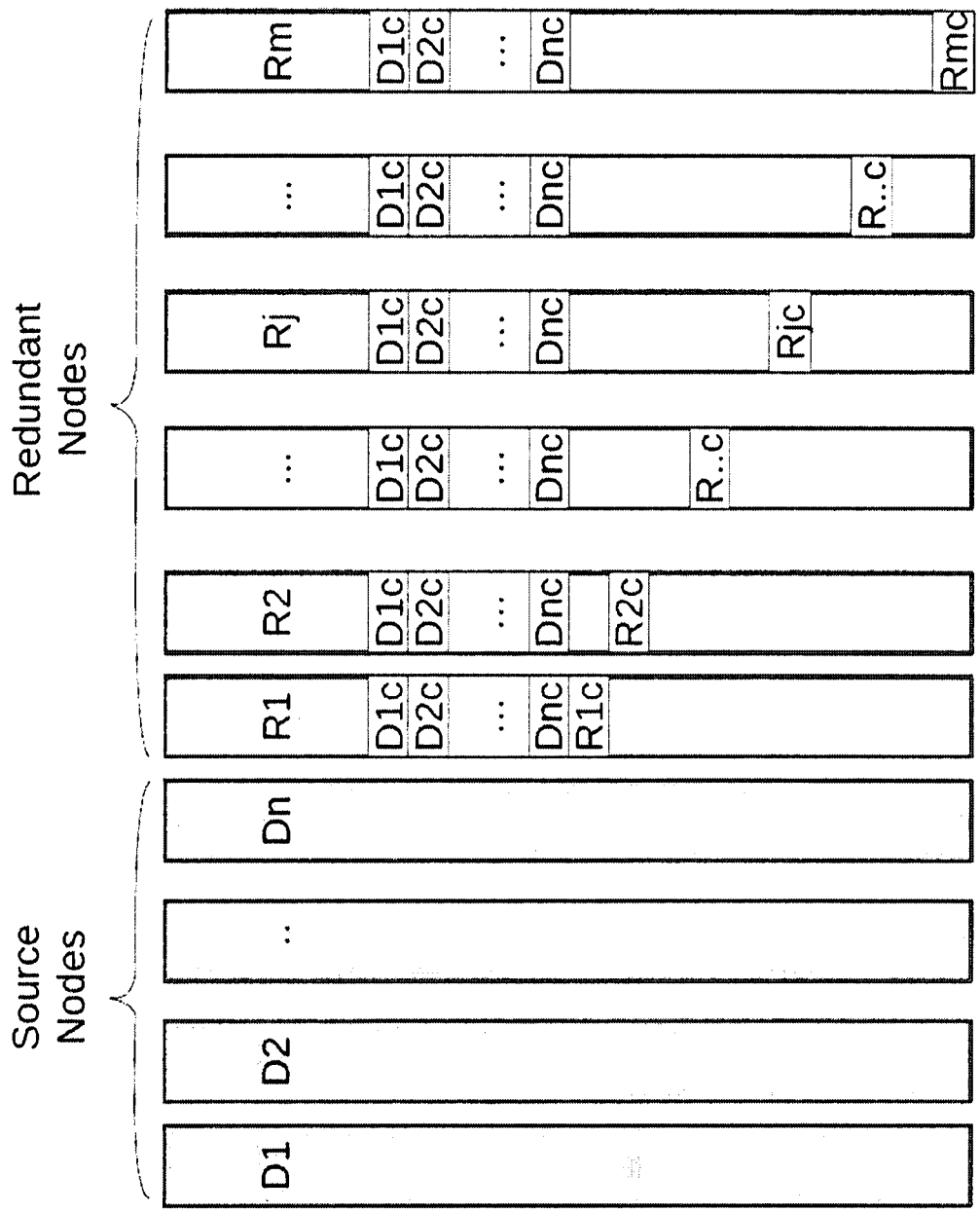
FIG. 5 shows data in source and redundant nodes according to an embodiment.

Embodiments include there being one block that is associated with up to R data characterising values, one for each of the redundant nodes. However, a particular preferred embodiment is shown in FIG. 5 in which all blocks, for both the source and redundant nodes, are associated with only one data characterising value. The embodiment shown in FIG. 5 is an extension of that shown in FIG. 4.

The number of redundant nodes that have blocks determined in dependence on a data characterising value is at least 1 and less than or equal to R. Embodiments therefore include one or more of the redundant nodes with no sub-blocks that are generated in dependence on a data characterising value.

Implementations of a fourth embodiment are shown in FIGS. 6 to 8. The fourth embodiment improves on known systems that use triplication, i.e. each of three nodes are intended to store exactly the same data.

In the implementation shown in FIG. 6, there are three nodes that are shown as D1, D2 (or Dr1) and D3 (or Dr2). D1 only comprises source data. The other nodes mostly comprise a copy of the source data but also store data characterising values of the data as shown. An alternative to the implementation shown in FIG. 6 is for the sub-block in the D3 node that is in the same block as D1$_{X-2}$ in D1 to be calculated in dependence on CRC(D1\D1$_{x-2}$)$^2$ instead of CRC(D1\D1$_{x-2}$) as shown in FIG. 6. This use of higher GF field mathematics improves the data recovery capability.

Another implementation of the fourth embodiment is shown in FIG. 7.

Another implementation of the fourth embodiment is shown in FIG. 8.

Advantageously, the implementations of the fourth embodiment all improve on known triplication techniques because the verification of the data and correction of errors is improved.

In the above embodiments, the data is arranged in a data array and the systematic coding of the data results in data array comprising separate source nodes and redundant nodes. According to fifth and sixth embodiments, the under lying coding of the data is still systematic but the data characterising values are included in both source nodes and redundant nodes instead of just the redundant nodes.

A fifth embodiment is shown in FIG. 9. The embodiment is similar to the first embodiment as shown in FIG. 1 however the data characterising values are not all stored in the same node. The data characterising values are alternatively stored across all of the nodes, including the source nodes.

A sixth embodiment is shown in FIG. 10. The embodiment is similar to the fourth embodiment as shown in FIGS.

6 to 8 however the data characterising values are alternatively stored across all of the nodes, including the source nodes.

According to a seventh embodiment, a plurality of sets of source nodes and redundant nodes are provided. Sub-blocks in one or more of the redundant nodes in one of the sets are generated that comprise data characterising values of one or more of the source nodes in all of the sets. Advantageously, all of the data characterising values for verifying the source data can be obtained from sub-blocks in only one redundant node. This is more efficient than obtaining data characterising values from a plurality of redundant nodes.

An implementation of the seventh embodiment is shown in FIG. 11. In the shown implementation, there are three sets of source and redundant nodes. Set 1 comprises source nodes D1 and D2 as well as redundant nodes R1 and R2. Set 2 comprises source nodes D3 and D4 as well as redundant nodes R3 and R4. Set 3 comprises source nodes D5 and D6 as well as redundant nodes R5 and R6.

The data in the redundant nodes of Set 1 and Set 2 are coded according to the second embodiment. Accordingly, as shown in FIG. 11, R1 has a sub-block that is dependent on the data characterising value associated with node D1, a further sub-block that is dependent on the data characterising value associated with node D2 and a further sub-block that is dependent on the data characterising value associated with node R1. Nodes R2, R3 and R4 are similarly determined.

For Set 3, the redundant node R5 is first generated in a similar way to the other redundant nodes with a sub-block that is dependent on the data characterising value associated with node D5 and a further sub-block that is dependent on the data characterising value associated with node D6. Four of the other sub-blocks of R5 are then combined, for example by XOR operations or with operations in a higher field than GF(2), with the data characterising values for the source nodes in the other sets. After the other sub-blocks in R5 have been determined, a sub-block that is dependent on the data characterising value associated with node R5 is also generated. The redundant node R6 can either be generated in a corresponding manner to R5, be generated in a corresponding manner to R2 or R4, or be generated as with all sub-blocks of the redundant node being dependent on a combination of sub-blocks of source data only.

The seventh embodiment also includes a number of variations to the specific implementation shown in FIG. 11 and described above. For example, the coding technique may be according to any of the other coding techniques of embodiments described herein. Each set may also comprise any number of source nodes and any number of redundant nodes.

According to a further embodiment, a sub-block may be dependent on more than one data characterising value. FIG. 12 shows an embodiment in which a sub-block is dependent on more one differently calculated data characterising values. The data characterising values do not need to be calculated in dependence on contiguous sub-blocks. The different data characterising values may each be generated in dependence on different subsets of the sub-blocks comprised by the same node. Data characterising values may also be calculated with more than one sub-block of the node not used in the calculation of the data characterising value.

FIG. 13 shows an embodiment in which a sub-block is generated in dependence on a plurality of data characterising values and the data characterising values have been generated in dependence on sub-blocks of different nodes. The sub-block may be generated in dependence on data characterising values have been generated in dependence on sub-blocks of source and/or redundant nodes.

FIG. 14 shows an embodiment in which a data characterising value is stored across a plurality of sub-blocks. Each part of a data characterising value may or may not overlap other data characterising values. In particular the first bits of a data characterising value may overlap with the last bits of a different data characterising value, while also having a middle set of bits that do not overlap any other data characterising value. Not all bits of a data characterising value need be used, and some bits may be ignored. Ignoring bits may be appropriate for CRC checksum algorithms that produce a large number of bytes as an output, such SHA3-512 with 64 byte output. In FIG. 14. The bits of the data characterising value $CRC(D2\backslash(D2_{x-3}-D2_{x-1})$ are split into three sections. The three sections are referred to as High bits, Middle bits and Low bits. The different sections of CRC $(D2\backslash(D2_{x-3}-D2_{x-1})$ are stored in different sub-blocks.

FIG. 15 is a flowchart of processes according to an embodiment of a computer-implemented method of including data characterising values of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data.

In step 1501, the process begins.

In step 1503, K data characterising values are calculated in dependence on sub-blocks comprised by the source nodes, wherein each of the data characterising values is associated with a different one of the K source nodes, each of the K data characterising values is associated with a different block and each of the K data characterising values is calculated in dependence on all of the sub-blocks of the source node that the data characterising value is associated with except the one sub-block of the source node that is also comprised by the block that the data characterising value is associated with In step 1505, one or more sub-blocks of the source and redundant nodes are generated in dependence on the K data characterising values.

In step 1507, the process ends.

Embodiments of the invention also include a number of modifications and variations to the embodiments as described above.

Embodiments are not restricted to the underlying coding of the data being MDS codes or standard Reed-Solomon. Any forward error correction (FEC) code can be used, such as low-density parity-check (LDPC), Local Reconstruction Codes (LRC), minimum-bandwidth regenerating (MBR) codes and minimum-storage regenerating (MSR) codes. Also, there does not need to be a fixed number of redundancy nodes. Rateless erasure codes such as fountain codes can also be used. In addition, embodiments are not restricted to the underlying coding of the data being systematic. The underlying coding may alternatively be non-systematic.

A preferred embodiment for encoding source data first comprises calculating all of the data characterising values of the source data and including these data characterising values within sub-blocks of the source nodes according to any of the techniques described in the present document. All of the redundant nodes are then calculated according to the underlying coding scheme, e.g. RS coding. All of the data characterising values of the redundant nodes are then calculated and included within sub-blocks of the redundant nodes according to any of the techniques described in the present document. The source data nodes, without the data characterising values included, are then stored/used. The source data nodes with the data characterising values included are no longer required and can be discarded.

To recover the data, the non-lost source data nodes (without the data characterising values included) are obtained/read. All of the data characterising values of the non-lost source data are then calculated and included within sub-blocks of the non-lost source nodes. All of the data characterising values of the redundant nodes are then calculated and subtracted from the redundant nodes. Recovery according to the coding scheme is then performed if it is determined that recovery is required. All of the data characterising values of the recovered source data are calculated and subtracted from the recovered source nodes. Advantageously, the characterising values are transparent to the coding scheme both during encoding and decoding.

The sub-blocks of nodes that are generated in dependence on data characterising values may be located anywhere within the nodes and are not restricted to being the last sub-blocks in the node. By spreading out the sub-blocks that are generated in dependence on data characterising values within a node, the likelihood of losing all of the data characterising value data due to burst errors is reduced.

Embodiments include the same sub-block being included in more than one data characterising value. Preferably, every sub-block is included in at least one data characterising value. A data characterising value may be generated in dependence on a sub-block that has itself been generated in dependence on a data characterising value.

Embodiments include data characterising values only being determined for source nodes and not redundant nodes.

Embodiments include any technique of combining data characterising values with sub-blocks of source and redundant nodes. Advantageously, the information provided by the data characterising values is contained in the source and redundant nodes and the metadata of the system is not increased.

Embodiments include rearranging the source data prior to coding. The source data that is used to generate coded data is therefore a rearranged version of the source data that is received for coding. Advantageously, rearranging the source data allows the data characterising values to be computed in a contiguous way, and not in a way that is restricted by how the source data was received. The location of data that is not included in each of the data characterising values can therefore be moved to any location within the original source data that is received for coding.

The actual generation of coded data in dependence on source data according to embodiments can be performed with known techniques and using known hardware. The processes required to use the techniques according to embodiments to generate a plurality of source nodes and redundant nodes in a data storage system/network of a data centre storing the coded data would be a straightforward task for the skilled person. The skilled person would also be able to use known hardware to reconstruct one or more source nodes in order to implement embodiments.

The nodes according to embodiments include single data disks, or drives, or groups or data disks, or drives. A node includes any form of data storage element, a part of such an element or multiple such elements. In particular, a node can be any logical entity where data can be stored, and can be anything from a whole, a group of or parts of physical storage devices or locations including but not limited to memory based storage devices such as RAM and SSDs, hard drives, tape storage, optical storage devices, servers and data centers. The method according to embodiments may be performed within a single SSD disk. The method according to embodiments may be performed between chips inside a SSD, or between banks inside (flash) chips.

The storage of the data in a data storage system is not limited to the data storage system having nodes, i.e. data drives or sections of a data drive, that are only for use as a store of source data node or redundant data. A mapping may be introduced so that a data drive may store redundant data within a source data node and vice-versa. This interleaving of data changes the mapping of coded data to stored data and can be used to control the read operations from a data storage system, for example to ensure that the network traffic is balanced across the data storage system.

Although data storage is a particularly preferable application for the coding techniques disclosed herein embodiments include the generation of codes for any application, such as data transmission. For example, the nodes and/or blocks may correspond to data packets for transmission over a network. In particular, the embodiments can be used to determine data packets for transmission as TCP/IP or UDP packets, as well as other form of data packets used for data transmission over a network.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

Methods and processes described herein can be embodied as code (e.g., software code) and/or data. Such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system). It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), phase-change memory and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

The invention claimed is:

1. A computer-implemented method of including data characterising values of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method comprising:

calculating K data characterising values in dependence on sub-blocks comprised by the source nodes, wherein each of the data characterising values is associated with a different one of the K source nodes, each of the K data characterising values is associated with a different block and each of the K data characterising values is calculated in dependence on all of the sub-blocks of the source node that the data characterising value is associated with except the one sub-block of the source node that is also comprised by the block that the data characterising value is associated with; and including the K data characterising values in data combinations that generate one or more sub-blocks of the source and redundant nodes to thereby generate one or more sub-blocks of the source and redundant nodes in dependence on the K data characterising values, wherein the size of said generated one or more sub-blocks of the source and redundant nodes is not increased by the included data characterising values in the data combinations that generate said one or more sub-blocks of the source and redundant nodes, wherein the data combinations that include the K data characterising values in the generated one or more sub-blocks of the source and redundant nodes are reversible data combination operations.

2. The method according to claim 1, the method further comprising:

calculating one or more further data characterising values in dependence on sub-blocks comprised by one or more redundant nodes, wherein each of said further data characterising values is associated with a different one of the R redundant nodes, each of said further data characterising values is associated with a block that is different from all other blocks for which there is an associated data characterising value that is associated with a source node, and each of said further data characterising values is calculated in dependence on all of the sub-blocks of the redundant node that the data characterising value is associated with except the one sub-block of the redundant node that is also comprised by the block that the data characterising value is associated with; and generating one or more sub-blocks of the source or redundant nodes in dependence on said further data characterising values.

3. The method according to claim 1, wherein different sub-blocks of the same redundant node are generated in dependence on each of the data characterising values;

wherein sub-blocks comprised by any of the source nodes may not be generated in dependence on a data characterising value.

4. The method according to claim 1, the method further comprising generating, for each block with an associated data characterising value, a sub-block of the block that is comprised by a redundant node in dependence on a combination of all of the sub-blocks of the block that are comprised by a source node and the data characterising value associated with the block.

5. The method according to claim 1, the method further comprising generating, for each sub-block in at least one redundant node, the sub-block in dependence on a combination of all of the sub-blocks in the same block as said sub-block and comprised by source nodes.

6. The method according to claim 1, the method further comprising generating, for at least one redundant node, the sub-blocks of the redundant node that are not comprised by blocks with an associated data characterising value in dependence on a combination of sub-blocks comprised by the source data nodes only.

7. The method according to claim 1, wherein one or more of the sub-blocks of one or more of the redundant nodes are generated in dependence on a XOR combination.

8. The method according to claim 1, wherein R may be 1, R may be 2 or more, K may be 1, K may be 2 or more, and the size of each sub-block may be one word.

9. The method according to claim 1, wherein each data characterising value is calculated according to any technique that allows verification of the data that the data characterising value is generated in dependence on.

10. The method according to claim 9, wherein each data characterising value is calculated as any of cyclic redundancy check, hash or signature of the data that it is dependent on.

11. The method according to claim 10, wherein each block with an associated data characterising value is associated with first and second data characterising values, the first data characterising value being the data characterising value as in any preceding claim, and a sub-block that is comprised by a first redundant node is generated in dependence on said first data characterising value, and a sub-block that is comprised by a second redundant node is generated in dependence on said second data characterising value;

wherein for each block with a first data characterising value that is associated with a source node, the second data characterising value may be the same as the first data characterising value;

wherein for each block with a first data characterising value associated with a first redundant node, the second data characterising value may be generated in dependence on all of the sub-blocks of a second redundant node except the one sub-block of the second redundant node that is comprised by the block associated with the data characterising value;

wherein in each of the redundant nodes, there may be a sub-block that is generated in dependence on a data characterising value that is associated with the redundant node that comprises said sub-block, and said data characterising value is generated in dependence on all of the sub-blocks of the redundant node except said sub-block that is generated in dependence on said data characterising value;

wherein there may be no block that comprises two sub-blocks that are both generated in dependence on data characterising values that have both been generated in dependence on sub-blocks of redundant nodes;

wherein, prior to any sub-packets being combined with a data characterising value, all of sub-packets comprised by a redundant node may be generated in accordance with any of maximum distance separable, MDS, coding, Reed-Solomon coding, forward error correction (FEC) coding, low-density parity-check (LDPC) coding, Local Reconstruction Codes (LRC) coding, minimum-bandwidth regenerating (MBR) coding, minimum-storage regenerating (MSR) coding, or coding with rateless codes or coding with fountain codes;

wherein, prior to any sub-packets being combined with a data characterising value, all of sub-packets comprised by all of the source and redundant nodes may be generated in accordance with a non-systematic coding technique;

wherein the one or more sub-blocks of one or more redundant nodes may be generated in dependence on the data characterising value by using operations in a GF field that is higher than GF(2);

wherein one or more of the sub-blocks comprised by a source node may be generated in dependence on a data characterising value;

wherein, optionally, no block comprises two sub-blocks that are generated in dependence on a data characterising value;

wherein the method may further comprise generating one or more of the sub-blocks in dependence on two data characterising values;

wherein the one or more of the sub-blocks that are generated in dependence on two data characterising values may be generated in dependence on data characterising values that have been generated in dependence on sub-blocks comprised by different source nodes.

12. The method according to claim 1, wherein different parts of the same data characterising value are stored in different sub-blocks.

13. The method according to claim 1, wherein said data characterising value, that is calculated in dependence on all of the sub-blocks of the source node that the data characterising value is associated with except the one sub-block of the source node that is also comprised by the block that the data characterising value is associated with, is two separate data characterising values.

14. The method according to claim 1, wherein each node is data drive of a data storage system.

15. The method according to claim 1, wherein each block is a data packet for transmission over a network.

16. A computer-implemented method, wherein there are a plurality of sets of nodes, and wherein each set comprises one or more source nodes and one or more redundant nodes, the method comprising:

generating, for each set, one or more redundant nodes of the set in dependence on data characterising values of the source nodes of the set; and generating one or more of the redundant nodes of one of the sets further in dependence on data characterising values of the source nodes in all of the other sets by including the data characterising values in the data combinations that generate said one or more of the redundant nodes, wherein the generation of nodes in dependence on the data characterising values does not increase the size of the nodes, and wherein the data combinations that include the data characterising values in said generated one or more redundant nodes are reversible data combination operations.

17. The method according to claim 16, wherein one or more of the nodes of one or more of the sets are generated according to a computer-implemented method of including data characterising values of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method of including data characterising values of source data in redundant data comprising:

calculating K data characterising values in dependence on sub-blocks comprised by the source nodes, wherein each of the data characterising values is associated with a different one of the K source nodes, each of the K data characterising values is associated with a different block and each of the K data characterising values is calculated in dependence on all of the sub-blocks of the source node that the data characterising value is associated with except the one sub-block of the source node that is also comprised by the block that the data characterising value is associated with; and generating one or more sub-blocks of the source and redundant nodes in dependence on the K data characterising values.

18. A computer-implemented method of determining if a data error has occurred, the method comprising:

obtaining a plurality of sub-blocks of source data;

obtaining one or more sub-blocks of redundant data, wherein at least one of the sub-blocks of redundant data has been generated by a reversible data combination process being performed between a data characterising value of the sub-blocks of source data and original redundant data so that redundant data is generated as combined data that has the same size as the original redundant data;

determining the data characterising value that said at least one of the sub-blocks of redundant data has been generated in dependence on;

calculating a data characterising value in dependence on the obtained sub-blocks of source data; and determining that a data error has occurred in dependence on a comparison of the data characterising value that said at least one of the sub-blocks of redundant data has been generated in dependence on and the data characterising value calculated in dependence on the obtained sub-blocks of source data.

19. The method according to claim 18, wherein the sub-blocks of source and redundant data have been generated in accordance with a computer-implemented method of including data characterising values of source data in redundant data, wherein there are K source nodes of source data and R redundant nodes of redundant data such that there are a plurality of N nodes, where N=(K+R), wherein each of the N nodes comprises a plurality of sub-blocks of data, wherein a block of data comprises N sub-blocks with each of the N sub-blocks comprised by a different one of the N nodes, such that each block comprises K sub-blocks of source data and R sub-blocks of redundant data, the method of including data characterising values of source data in redundant data comprising:

calculating K data characterising values in dependence on sub-blocks comprised by the source nodes, wherein each of the data characterising values is associated with a different one of the K source nodes, each of the K data characterising values is associated with a different block and each of the K data characterising values is calculated in dependence on all of the sub-blocks of the source node that the data characterising value is associated with except the one sub-block of the source node that is also comprised by the block that the data characterising value is associated with; and generating one or more sub-blocks of the source and redundant nodes in dependence on the K data characterising values.

20. The method according to claim 19, the method of determining if a data error has occurred further comprising correcting a detected error by applying logical deduction.

\* \* \* \* \*